United States Patent
Hayashi et al.

(10) Patent No.: US 11,387,446 B2
(45) Date of Patent: Jul. 12, 2022

(54) NEGATIVE ELECTRODE AND ZINC SECONDARY BATTERY

(71) Applicant: NGK INSULATORS, LTD., Nagoya (JP)

(72) Inventors: Hiroshi Hayashi, Nagoya (JP); Naomi Saito, Nagoya (JP); Eri Asano, Nagoya (JP); Hiroshi Matsubayashi, Suzuka (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/188,259

(22) Filed: Mar. 1, 2021

(65) Prior Publication Data

US 2021/0193989 A1  Jun. 24, 2021

Related U.S. Application Data

(63) Continuation-in-part of application No. PCT/JP2019/029882, filed on Jul. 30, 2019.

(30) Foreign Application Priority Data

Sep. 3, 2018  (JP) ............... JP2018-164484

(51) Int. Cl.
*H01M 4/24* (2006.01)
*H01M 4/32* (2006.01)
*H01M 4/42* (2006.01)
*H01M 4/48* (2010.01)
*H01M 4/62* (2006.01)
*H01M 10/30* (2006.01)
*H01M 12/08* (2006.01)

(52) U.S. Cl.
CPC ............. *H01M 4/244* (2013.01); *H01M 4/32* (2013.01); *H01M 4/42* (2013.01); *H01M 4/48* (2013.01); *H01M 4/622* (2013.01); *H01M 10/30* (2013.01); *H01M 12/08* (2013.01); *H01M 2300/0014* (2013.01)

(58) Field of Classification Search
None
See application file for complete search history.

(56) References Cited

U.S. PATENT DOCUMENTS

| | | | |
|---|---|---|---|
| 9,293,791 B2 | 3/2016 | Yamada et al. | |
| 10,290,847 B2 | 5/2019 | Kitoh et al. | |
| 10,541,450 B2 | 1/2020 | Watanabe | |
| 2005/0003271 A1* | 1/2005 | Jiang | H01M 4/622 429/229 |
| 2017/0214019 A1 | 7/2017 | Yokoyama et al. | |
| 2019/0267597 A1 | 8/2019 | Gonda et al. | |

FOREIGN PATENT DOCUMENTS

| | | | |
|---|---|---|---|
| CN | 101740762 | * | 6/2010 |
| JP | 2017-183110 A1 | | 10/2017 |
| WO | 2013/118561 A1 | | 8/2013 |
| WO | 2016/067884 A1 | | 5/2016 |
| WO | 2016/076047 A1 | | 5/2016 |
| WO | 2017/047628 A1 | | 3/2017 |
| WO | 2018/105178 A1 | | 6/2018 |

OTHER PUBLICATIONS

English translation of International Preliminary Report on Patentability (Chapter I) (Application No. PCT/JP2019/029882) dated Mar. 9, 2021.
International Search Report (Application No. PCT/JP2019/029882) dated Oct. 29, 2019 (with English translation).
International Written Opinion (Application No. PCT/JP2019/029882) dated Oct. 29, 2019 (with English translation).

* cited by examiner

*Primary Examiner* — Laura Weiner
(74) *Attorney, Agent, or Firm* — Burr & Brown, PLLC

(57) ABSTRACT

Provided is a negative electrode for use in a zinc secondary battery containing (A) ZnO particles and (B) at least two selected from the group consisting of (i) metallic Zn particles having an average particle size D50 of 5 to 80 μm, (ii) at least one metal element selected from In and Bi, and (iii) a binder resin having a hydroxyl group.

12 Claims, 1 Drawing Sheet

NEGATIVE ELECTRODE AND ZINC SECONDARY BATTERY

CROSS-REFERENCE TO RELATED APPLICATIONS

This application is a continuation-in-part application of PCT/JP2019/029882 filed Jul. 30, 2019, which claims priority to Japanese Patent Application No. 2018-164484 filed Sep. 3, 2018, the entire contents all of which are incorporated herein by reference.

BACKGROUND OF THE INVENTION

1. Field of the Invention

The present invention relates to a negative electrode and a zinc secondary battery.

2. Description of the Related Art

In zinc secondary batteries such as nickel-zinc secondary batteries, air-zinc secondary batteries, etc., metallic zinc precipitates from a negative electrode in the form of dendrites upon charging, and penetrates into voids of a separator such as a nonwoven fabric and reaches a positive electrode, which is known to result in bringing about short-circuiting. The short circuit due to such zinc dendrites shortens the life in repeated charge/discharge cycles.

In order to deal with the above issues, batteries comprising layered double hydroxide (LDH) separators that prevent penetration of zinc dendrites while selectively permeating hydroxide ions, have been proposed. For example, Patent Literature 1 (WO2013/118561) discloses that an LDH separator is provided between a positive electrode and a negative electrode in a nickel-zinc secondary battery. Moreover, Patent Literature 2 (WO2016/076047) discloses a separator structure comprising an LDH separator fitted or joined to a resin outer frame, and discloses that the LDH separator has a high density to the degree that it has gas impermeability and/or water impermeability. Moreover, this literature also discloses that the LDH separator can be composited with porous substrates. Further, Patent Literature 3 (WO2016/067884) discloses various methods for forming an LDH dense membrane on a surface of a porous substrate to obtain a composite material. This method comprises steps of uniformly adhering a starting material that can impart a starting point for LDH crystal growth to a porous substrate and subjecting the porous substrate to hydrothermal treatment in an aqueous solution of raw materials to form the LDH dense membrane on the surface of the porous substrate.

CITATION LIST

Patent Literature

Patent Literature 1: WO2013/118561
Patent Literature 2: WO2016/076047
Patent Literature 3: WO2016/067884

SUMMARY OF THE INVENTION

By the way, another factor that shortens the life of a zinc secondary battery includes a morphological change of zinc which is a negative electrode active material. More specifically, as zinc repeatedly dissolves and precipitates by repetition of charge and discharge, the negative electrode changes its morphology, which causes clogging up of pores, zinc isolation, etc., and results in a problem of high resistance and difficulty in charge and discharge.

The present inventors have recently found that by using as a negative electrode ZnO particles in combination with at least two selected from (i) metallic Zn particles having a predetermined particle size, (ii) a predetermined metal element, and (iii) a predetermined binder resin, deterioration of the negative electrode accompanying repetition of charge and discharge can be inhibited to improve durability in a zinc secondary battery, and thereby the cycle life can be prolonged.

Thus, an object of the present invention is to provide a negative electrode of a zinc secondary battery capable of inhibiting deterioration of the negative electrode accompanying repetition of charge and discharge to improve durability and thereby prolonging the cycle life.

According to an aspect of the present invention, there is provided a negative electrode for use in a zinc secondary battery, comprising:
  (A) ZnO particles; and
  (B) at least two selected from the following group consisting of
   (i) metallic Zn particles having an average particle size D50 of 5 to 80 μm,
   (ii) at least one metal element selected from In and Bi, and
   (iii) a binder resin having a hydroxyl group,
  wherein when the negative electrode comprises In, the content of In is 2.4 parts by weight or less in terms of oxide, based on the content of the ZnO particles being 100 parts by weight,
  wherein when the negative electrode comprises Bi, the content of Bi is 0.6 parts by weight or less in terms of oxide, based on the content of the ZnO particles being 100 parts by weight, and
  wherein when the negative electrode comprises the binder resin, the content of the binder resin on a solid basis is 0.05 parts by weight or less, based on the content of the ZnO particles being 100 parts by weight.

According to an aspect of the present invention, there is provided a zinc secondary battery, comprising:
  a positive electrode,
  the negative electrode,
  a separator separating the positive electrode from the negative electrode so as to be capable of conducting hydroxide ions therethrough, and
  an electrolytic solution.

DETAILED DESCRIPTION OF THE INVENTION

Negative Electrode

Figure 1:
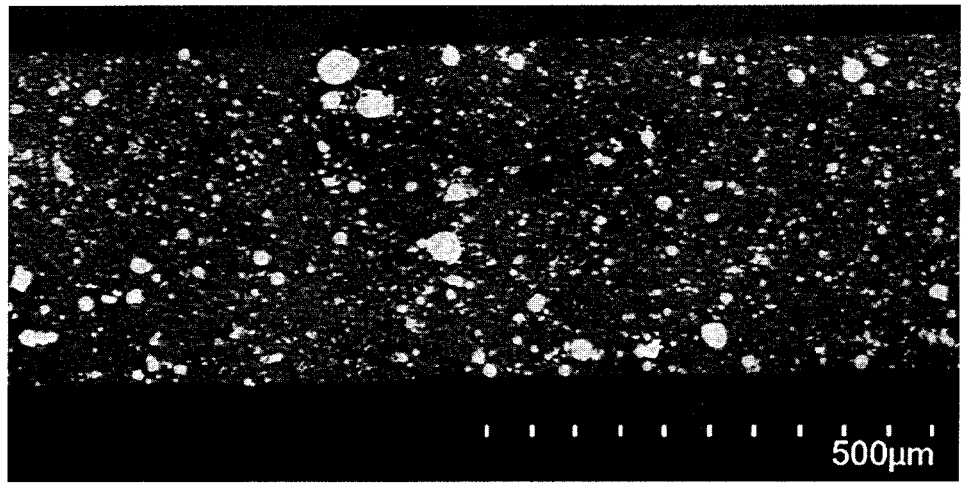
FIG. 1 shows a cross-sectional SEM image of the negative electrode fabricated in Example 7.

The negative electrode of the present invention is a negative electrode used in a zinc secondary battery. This negative electrode comprises (A) ZnO particles and (B) at least two selected from the following group: (i) metallic Zn particles having an average particle size D50 of 5 to 80 μm, (ii) at least one metal element selected from In and Bi, and (iii) a binder resin having a hydroxyl group. Meanwhile, when the negative electrode comprises In, the content of In is 2.4 parts by weight or less in terms of oxide, based on the content of the ZnO particles being 100 parts by weight. Moreover, when the negative electrode comprises Bi, the content of Bi is 0.6 parts by weight or less in terms of oxide, based on the content of the ZnO particles being 100 parts by weight. Further, when the negative electrode comprises a binder resin, the content of the binder resin on a solid basis is 0.05 parts by weight or less, based on the content of the ZnO particles being 100 parts by weight. As described above, by using as a negative electrode the ZnO particles in combination with at least two selected from (i) metallic Zn particles having a predetermined particle size, (ii) a predetermined metal element, and (iii) a predetermined binder resin, deterioration of the negative electrode accompanying repetition of charge and discharge can be inhibited to improve durability in a zinc secondary battery, and thereby the favorable battery performance can be maintained even after a large number of times of charge/discharge cycles. Thus, the cycle life of the battery can be prolonged as compared with the conventional ZnO/Zn-containing negative electrode. For example, charge and discharge can be carried out about 1.5 to 3 times as many times as compared with the conventional ZnO/Zn-containing negative electrode. Although the reason is not clear, it is conjectured, because the micromorphological change of the negative electrode (typically, the densification of the microstructure or microporous structure brought about by ZnO particles or metallic Zn particles) is less likely to occur even after a large number of charge/discharge cycles, which results in maintaining the favorable permeation of an electrolytic solution into the negative electrode. In other words, it is considered that an increase in resistance is inhibited by the inhibition of the micromorphological change of such a negative electrode, thereby improving a battery performance after a large number of charge/discharge cycles.

The negative electrode of the present invention comprises ZnO particles as the component (A). The ZnO particles are not particularly restricted provided that commercially available zinc oxide powder used for a zinc secondary battery or zinc oxide powder obtained by growing particles by a solid phase reaction, etc., by using these powders as starting materials, may be used. The D50 particle size of the ZnO particle is preferably 0.1 to 20 μm, more preferably 0.1 to 10 μm, and even more preferably 0.1 to 5 μm.

The negative electrode of the present invention comprises as the component (B) at least two selected from the group consisting of metallic Zn particles having an average particle size D50 of 5 to 80 μm (hereinafter, component (i)), at least one metal element selected from In and Bi (hereinafter, component (ii)), and a binder resin having a hydroxyl group (hereinafter, component (iii)). Here, "at least two" refers to comprising at least a combination of the component (i) and the component (ii), a combination of the component (ii) and the component (iii), or a combination of the component (i) and the component (iii). The component (B) preferably comprises the component (i) and at least one of the component (ii) and the component (iii). The component (B) particularly preferably comprises all of the component (i), the component (ii) and the component (iii).

The component (i) is composed of metallic Zn particles. The metallic Zn particles can be used as metallic Zn particles generally used for zinc secondary batteries; however, the use of smaller metallic Zn particles is more preferable from the viewpoint of prolonging a cycle life of the battery. Specifically, the D50 particle size of the metallic Zn particles is 5 to 80 μm, preferably 8 to 60 μm, and more preferably 10 to 50 μm. Assuming that the content of ZnO particles is 100 parts by weight, the preferred content of the metallic Zn particles in the negative electrode is preferably 10 to 90 parts by weight, more preferably 15 to 50 parts by weight, still more preferably 20 to 45 parts by weight, and particularly preferably 25 to 35 parts by weight. As will be described below, the metallic Zn particles may be doped with In and/or Bi of the component (ii).

The component (ii) is at least one metal element selected from In and Bi. The metal element may be contained in the negative electrode in any form such as metal, oxide, hydroxide, or another compound, however, it is preferably contained in the form of oxide or hydroxide, more preferably in the form of oxide. The oxide of the metal element includes, for example, $In_2O_3$, $Bi_2O_3$, etc. The hydroxide of the metal element includes, for example, $In(OH)_3$, $Bi(OH)_3$, etc. When the negative electrode comprises In, the content of In is preferably 2.4 parts by weight or less in terms of oxide, based on the content of the ZnO particles being 100 parts by weight, more preferably 0.3 to 2.4 parts by weight, still more preferably 0.6 to 2.0 parts by weight, particularly preferably 0.8 to 1.5 parts by weight, and most preferably 0.9 to 1.2 parts by weight. Moreover, when the negative electrode comprises Bi, the content of Bi is 0.6 parts by weight or less in terms of oxide, based on the content of the ZnO particles being 100 parts by weight, more preferably 0.006 to 0.3 parts by weight, and still more preferably 0.01 to 0.1 parts by weight. In the typical aspect of the present invention, the content of In is 0.3 to 2.4 parts by weight in terms of oxide and the content of Bi is 0 to 0.6 parts by weight in terms of oxide, based on the content of ZnO particles being 100 parts by weight.

When the component (ii) is contained in the negative electrode in the form of an oxide or hydroxide, all of In and/or Bi are not necessarily in the form of oxide or hydroxide, and a portion thereof may be contained in the negative electrode in another form such as metals or other compounds. For example, the above metal elements may be doped as trace elements in the metallic Zn particles of the component (i). In this case, the concentration of In in the metallic Zn particles is preferably 50 to 2000 ppm by weight, more preferably 200 to 1500 ppm by weight, and the concentration of Bi in the metallic Zn particles is preferably 50 to 2000 ppm by weight and more preferably 100 to 1300 ppm by weight. For example, a portion of the metal elements may be contained in the metallic Zn particles of the component (i) and the rest of the metal elements may be contained in the negative electrode in the form of oxides and/or hydroxides. The component (ii) is preferably in powder form. The D50 particle size of the component (ii) in powder form (for example, oxide or hydroxide) is preferably 0.1 to 5 μm, more preferably 0.2 to 3 μm, and still more preferably 0.5 to 2 μm.

The component (iii) is a binder resin having a hydroxyl group. The binder resin having a hydroxyl group is preferably a water-soluble polymer. Although the water-soluble polymer may be cold-water-soluble, it may also be warm-water-soluble or hot-water-soluble. However, a hydroxyl group-containing resin that is not necessarily water-soluble (for example, a resin that swells but does not dissolve in water) can also be used as the component (iii) provided that the desired effect can be obtained. The water-soluble polymer preferably includes, for example, polyvinyl alcohol (PVA), vinylon (PVA fiber), a polyvinyl acetal resin, more preferably the PVA, the vinylon and the polyvinyl acetal resin, and particularly preferably the PVA. When the negative electrode comprises the component (iii), the content of the component (iii) on a solid basis is preferably 0.05 parts by weight or less, based on the content of the ZnO particles being 100 parts by weight, more preferably 0.01 to 0.05 parts by weight on a solid basis, and still more preferably 0.01 to 0.04 parts by weight.

The negative electrode active material may be composed of a gel form, or may be mixed with an electrolytic solution to form a negative electrode mixture. For example, a gelled negative electrode can be easily obtained by adding an electrolytic solution and a thickener to the negative electrode active material. The thickener includes, for example, polyacrylic acid salt, CMC, alginic acid, etc., but polyacrylic acid is preferred because of the excellent chemical resistance to strong alkali.

The shape of the negative electrode material is not particularly limited, but it is preferably in the form of powder, which thereby increases the surface area and can cope with a large current discharge. When the surface area of the negative electrode material is so large as described above, it is not only suitable for coping with a large current discharge, but also facilitated to be mixed uniformly with the electrolytic solution and a gelling agent, and it is further favorable in handleability upon assembling of a battery.

The negative electrode may further comprise another binder in addition to the component (iii). The negative electrode comprising the binder maintains the shape of the negative electrode more easily. Various known binders can be used as the binder and a preferable example thereof is polytetrafluoroethylene (PTFE). Both PVA (component (iii)) and PTFE are particularly preferably combined for use as the binder.

The negative electrode is preferably a sheet-like pressed product, and thereby it is possible to prevent the electrode active material from falling off and improve the electrode density, which more effectively inhibits the morphological change of the negative electrode. Such a sheet-like pressed product can be fabricated by adding a binder to a negative electrode material followed by kneading, and pressing the obtained kneaded product by a roll press machine, etc., into a sheet.

A current collector is preferably provided on the negative electrode. The current collector preferably includes, for example, a copper punching metal and a copper expanded metal. In this case, for example, a negative electrode plate consisting of the negative electrode/negative electrode current collector can be preferably fabricated by coating a surface of a copper punching metal or a copper expanded metal with a mixture containing a Zn compound, metallic zinc and zinc oxide powder, and optionally a binder (for example, polytetrafluoroethylene particles). At this time, the negative electrode plate (i.e., the negative electrode/the negative electrode current collector) after drying is also preferably subjected to press treatment to prevent the electrode active material from falling off and improve the electrode density. Alternatively, the sheet-like pressed product as described above may be compressed and bonded to a current collector such as a copper expanded metal.

Zinc Secondary Battery

The negative electrode of the present invention is preferably applied to a zinc secondary battery. Therefore, according to a preferred embodiment of the present invention, a zinc secondary battery comprising a positive electrode, a negative electrode, a separator separating the positive electrode from the negative electrode so as to be capable of conducting hydroxide ions therethrough, and an electrolytic solution, is provided. The zinc secondary battery of the present invention is not particularly restricted provided that it is a secondary battery in which zinc is used as a negative electrode and an electrolytic solution (typically an alkali metal hydroxide aqueous solution) is used. Therefore, it can be a nickel-zinc secondary battery, a silver oxide-zinc secondary battery, a manganese oxide-zinc secondary battery, a zinc-air secondary battery, or various other alkaline-zinc secondary batteries. For example, a positive electrode preferably comprises nickel hydroxide and/or nickel oxyhydroxide whereby the zinc secondary battery forms a nickel-zinc secondary battery. Alternatively, the positive electrode may be an air electrode whereby the zinc secondary battery forms a zinc-air secondary battery.

The separator is preferably a layered double hydroxide (LDH) separator, which comprises an LDH and/or an LDH-like compound. As described above, LDH separators have been known in the field of nickel-zinc secondary batteries or zinc-air secondary batteries (see Patent Literatures 1 to 3), and an LDH separator can also be preferably used for the zinc secondary battery of the present invention. Throughout the specification, "LDH separator" is defined as a separator that includes an LDH and/or an LDH-like compound (collectively referred to as a "hydroxide-ion conductive layered compound") and can selectively permit hydroxide ions to migrate solely by means of hydroxide ion conductivity of the hydroxide-ion conductive layered compound. The term "LDH-like compound" as used herein means a hydroxide and/or an oxide with a layered crystal structure analogous to LDH, which may not be called LDH, and can be said to be an equivalent of LDH. However, as a broad definition, "LDH" can be interpreted to include not only LDH but also LDH-like compounds. The LDH separator can prevent the penetration of zinc dendrites while selectively allowing hydroxide ions to permeate. Combined with the effect of adopting the negative electrode of the present invention, the durability of the zinc secondary battery can be further improved.

The LDH separator may be composited with porous substrates as disclosed in Patent Literatures 1 to 3. The porous substrate may be composed of any of ceramic materials, metallic materials, and polymer materials; however, it is particularly preferably composed of the polymer materials. The polymer porous substrate has advantages of 1) flexibility (hence, it is hard to break even if being thin.), 2) facilitation of increase in porosity, 3) facilitation of an increase in conductivity (because it can be rendered thin while increasing porosity.), and 4) facilitation of manufacture and handling. The polymer material is particularly preferably polyolefins such as polypropylene, polyethylene, etc., and most preferably polypropylene, in terms of excellent hot-water resistance, excellent acid resistance and excellent alkali resistance as well as low cost. When the porous substrate is composed of the polymer material, a functional layer is particularly preferably incorporated over the entire region of the thickness direction of the porous substrate (for example, most or almost all the pores inside the porous substrate are filled with LDH and/or an LDH-like compound.). In this case, the thickness of the polymer porous substrate is preferably 5 to 200 µm, more preferably 5 to 100 µm, and still more preferably 5 to 30 µm. A microporous membrane that is commercially available as a separator for lithium batteries can be preferably used as such polymer porous substrates.

The electrolytic solution preferably comprises an alkali metal hydroxide aqueous solution. The alkali metal hydroxide includes, for example, potassium hydroxide, sodium hydroxide, lithium hydroxide, ammonium hydroxide, etc., however, potassium hydroxide is more preferred. Zinc oxide, zinc hydroxide, etc., may be added to the electrolytic solution in order to inhibit spontaneous dissolution of the zinc-containing material.

The electrolytic solution preferably further contains amino acid in addition to the alkali metal hydroxide aqueous solution (typically potassium hydroxide aqueous solution) from the viewpoint of prolonging the cycle life. The amino acid includes, for example, glutamic acid, aspartic acid, leucine, isoleucine, tryptophan, histidine, methionine, glycine, proline, tyrosine, lysine, etc., and it preferably includes leucine and isoleucine and more preferably leucine. The mechanism by which the cycle life is prolonged when the electrolytic solution contains amino acid such as leucine, is not clear, however, it is conjectured that i) amino acid captures Zn ions and forms a complex, which causes inhibition of the movement of Zn ions, and thereby the macromorphological change of the negative electrode can be inhibited, and ii) amino acid such as leucine is adsorbed on the surface of the negative electrode active material such as ZnO, which brings about steric hindrance, in addition that the amino acid captures Zn ions as described above, and thereby micromorphological change of the negative electrode can be more effectively inhibited. When the electrolytic solution contains amino acid (for example, leucine), the concentration of the amino acid (for example, leucine) in the electrolytic solution is preferably 0.1 to 80 g/L, more preferably 1 to 70 g/L, still more preferably 5 to 60 g/L, particularly preferably 10 to 50 g/L, and most preferably 20 to 50 g/L.

The electrolytic solution preferably further contains boric acid in addition to the alkali metal hydroxide aqueous solution (typically potassium hydroxide aqueous solution) from the viewpoint of prolonging the cycle life. During charge and discharge, hydroxide ions are increased or decreased both around the negative electrode and around the positive electrode due to the electrochemical reaction, so that the pH of the electrolytic solution may locally be changed. In this respect, it is conjectured that boric acid functions as a buffer solution, so that the pH change of the electrolytic solution due to charge and discharge is inhibited, and the conductivity of the electrolytic solution can be maintained constant whereby the battery performance after a large number of charge/discharge cycles will be improved.

The electrolytic solution preferably further contains sodium hydroxide in addition to the potassium hydroxide aqueous solution from the viewpoint of prolonging the cycle life. It is conjectured that the electrolytic solution comprising sodium hydroxide can enhance the overvoltage of oxygen evolution and inhibit oxygen evolution from the positive electrode accompanying the overcharge, so that the battery performance after a large number of charge/discharge cycles will be improved. Furthermore, the electrolytic solution preferably contains both boric acid and sodium hydroxide in addition to the potassium hydroxide aqueous solution from the viewpoint of prolonging the cycle life.

EXAMPLES

The present invention will be described in more detail with reference to the following Examples.

Examples 1 to 32

(1) Preparation of Positive Electrode

A paste-type nickel hydroxide positive electrode (capacity density: about 700 mAh/cm$^3$) was prepared.

(2) Fabrication of Negative Electrode

Various raw material powders shown below were prepared.

<Component A>
ZnO powder (manufactured by Seido Chemical Industry Co., Ltd., JIS Standard Class 1 grade, average particle size D50:0.2 μm)

<Component B>
Component (i)
Metallic Zn powder (manufactured by Mitsui Mining & Smelting Co., Ltd., Bi and In-doped, Bi: 1000 ppm by weight, In: 1000 ppm by weight, average particle size D50 is as shown in Tables 1 and 2.)

Component (ii)
$In_2O_3$ powder (manufactured by High Purity Chemical Laboratory Co., Ltd., purity: 99.99%, average particle size D50: adjusted to 1.0 μm)
$In(OH)_3$ powder (manufactured by High Purity Chemical Laboratory Co., Ltd., purity: 99.99%, average particle size D50: adjusted to 1.0 μm)
$Bi_2O_3$ powder (manufactured by High Purity Chemical Laboratory Co., Ltd., purity: 99.99%, average particle size D50: adjusted to 1.0 μm)

Component (iii)
Polyvinyl alcohol (PVA) (manufactured by Wako Pure Chemical Industries, Ltd.)
Vinylon (PVA fiber) (manufactured by Kuraray Co., Ltd., brand: VPB041)
Polyvinyl acetal resin (manufactured by Sekisui Chemical Co., Ltd., Eslec B, product type: BL-S)

According to the compounding ratios shown in Tables 1 and 2, the component i (metallic Zn powder), the component ii ($In_2O_3$ powder, $In(OH)_3$ powder or $Bi_2O_3$ powder) and/or the component iii (PVA, vinylon or BL-S), were added to the ZnO powder, and 1.26 parts by weight of polytetrafluoroethylene (PTFE)-dispersed aqueous solution (manufactured by Daikin Industries, Ltd., solid content of 60%) was further added in terms of solid content and kneaded with propylene glycol. The obtained kneaded product was rolled by a roll press to obtain a negative electrode active material sheet. The negative electrode active material sheet was compressed and adhered to a tin-plated copper expanded metal to obtain a negative electrode. FIG. 1 shows a cross-sectional SEM image of the negative electrode fabricated in Example 7.

(3) Preparation of Electrolytic Solution

Ion-exchanged water was added to a 48% potassium hydroxide aqueous solution (manufactured by Kanto Chemical Co., Inc., special grade) to adjust the KOH concentration to 5.4 mol %, and then zinc oxide was dissolved at 0.42 mol/L by heating and stirring to obtain an electrolytic solution.

(4) Fabrication of Evaluation Cell

The positive electrode and the negative electrode were each wrapped with a nonwoven fabric, and each welded with a current extraction terminal. The positive electrode and the negative electrode thus fabricated were opposed to each other with the LDH separator interposed therebetween, sandwiched by a laminated film provided with a current extraction port, and the laminated film was heat-sealed on three sides thereof. The electrolytic solution was added to the obtained cell container with the upper side being opened, and was sufficiently permeated into the positive electrode and the negative electrode by vacuum evacuation, etc. Thereafter the remaining one side of the laminated film was also heat-sealed to form a simply sealed cell.

(5) Evaluation

Chemical conversion was carried out on the simply sealed cell with 0.1 C charge and 0.2 C discharge by using a charge/discharge apparatus (TOSCAT3100 manufactured by Toyo System Co., Ltd.). Then, a 1 C charge/discharge cycle was carried out. The charge/discharge cycle was repeated under the same conditions, and the number of charge/discharge cycles until a discharging capacity decreased to 70% of the discharging capacity at the first cycle of the prototype battery, was recorded. The number of charge/discharge cycles of each example is shown in Tables 1 and 2 as a relative value obtained when the number of charge/discharge cycles in Example 23 was 1.0, together with the evaluation results based on the following criteria.

<Evaluation Criteria>

Evaluation A: The number of charge/discharge cycles (relative value to the number of times of Example 23) is 2.2 or more.

Evaluation B: The number of charge/discharge cycles (relative value to the number of times of Example 23) is 1.7 or more and less than 2.2.

Evaluation C: The number of charge/discharge cycles (relative value to the number of times of Example 23) is less than 1.7.

TABLE 1

| | Component (A) ZnO Parts by weight | Component (i) Zn Parts by weight | Component (i) Zn D50 (μm) | Component (B) Component (ii) In$_2$O$_3$ Parts by weight | Component (B) Component (ii) In(OH)$_3$ Parts by weight | Component (B) Component (ii) Bi$_2$O$_3$ Parts by weight | Component (B) Component (iii) PVA Parts by weight (in terms of solid content) | Component (B) Component (iii) Vinylon Parts by weight (in terms of solid content) | Component (B) Component (iii) BL-S Parts by weight (in terms of solid content) | The number of charge/discharge times (relative value to the number of times of Example 23) | Charge/discharge evaluation |
|---|---|---|---|---|---|---|---|---|---|---|---|
| Ex. 1 | 100 | 31.2 | 10 | — | — | — | 0.02 | — | — | 2.1 | B |
| Ex. 2 | 100 | 5.2 | 10 | 1.0 | — | — | 0.02 | — | — | 1.8 | B |
| Ex. 3 | 100 | 5.2 | 10 | 0.5 | — | 0.5 | 0.02 | — | — | 2.2 | A |
| Ex. 4 | 100 | 5.2 | 75 | 1.0 | — | — | — | — | — | 2.1 | B |
| Ex. 5 | 100 | 18.2 | 10 | 1.0 | — | — | 0.02 | — | — | 1.7 | B |
| Ex. 6 | 100 | 31.2 | 10 | 0.5 | — | — | 0.02 | — | — | 2.1 | B |
| Ex. 7 | 100 | 31.2 | 10 | 1.0 | — | — | 0.02 | — | — | 2.7 | A |
| Ex. 8 | 100 | 31.2 | 10 | 2.0 | — | — | 0.02 | — | — | 2.2 | A |
| Ex. 9 | 100 | 31.2 | 50 | 1.0 | — | — | 0.02 | — | — | 2.6 | A |
| Ex. 10 | 100 | 5.2 | 10 | — | — | — | 0.02 | — | — | 1.9 | B |
| Ex. 11 | 100 | 46.8 | 10 | 1.0 | — | — | — | — | 0.02 | 2.7 | A |
| Ex. 12 | 100 | 31.2 | 10 | — | 1.5 | — | 0.02 | — | — | 2.3 | A |
| Ex. 13 | 100 | 31.2 | 10 | 1.0 | — | — | — | 0.02 | — | 2.2 | A |
| Ex. 14 | 100 | — | — | 1.0 | — | — | 0.02 | — | — | 1.7 | B |
| Ex. 15 | 100 | 12.5 | 30 | 1.0 | — | — | 0.02 | — | — | 2.0 | B |
| Ex. 16 | 100 | 18.7 | 30 | 1.0 | — | — | 0.02 | — | — | 2.1 | B |
| Ex. 17 | 100 | 25.0 | 30 | 1.0 | — | — | 0.02 | — | — | 1.9 | B |
| Ex. 18 | 100 | 31.2 | 30 | 1.0 | — | — | 0.02 | — | — | 2.2 | A |
| Ex. 19 | 100 | 41.7 | 30 | 1.0 | — | — | 0.02 | — | — | 2.4 | A |
| Ex. 20 | 100 | 55.0 | 30 | 1.0 | — | — | 0.02 | — | — | 2.5 | A |
| Ex. 21 | 100 | 68.7 | 30 | 1.0 | — | — | 0.02 | — | — | 2.4 | A |
| Ex. 22 | 100 | 88.5 | 30 | 1.0 | — | — | 0.02 | — | — | 2.0 | B |

TABLE 2

| | Component (A) ZnO Parts by weight | Component (i) Zn Parts by weight | Component (i) Zn D50 (μm) | Component (B) Component (ii) In$_2$O$_3$ Parts by weight | Component (B) Component (ii) In(OH)$_3$ Parts by weight | Component (B) Component (ii) Bi$_2$O$_3$ Parts by weight | Component (B) Component (iii) PVA Parts by weight (in terms of solid content) | Component (B) Component (iii) Vinylon Parts by weight (in terms of solid content) | Component (B) Component (iii) BL-S Parts by weight (in terms of solid content) | The number of charge/discharge times (relative value to the number of times of Example 23) | Charge/discharge evaluation |
|---|---|---|---|---|---|---|---|---|---|---|---|
| Ex. 23* | 100 | 5.2 | 75 | — | — | — | — | — | — | 1.0 | C |
| Ex. 24* | 100 | 5.2 | 10 | — | — | — | — | — | — | 1.3 | C |
| Ex. 25* | 100 | 5.2 | 10 | 0.33 | — | 0.67 | 0.02 | — | — | 1.3 | C |
| Ex. 26* | 100 | 5.2 | 10 | — | — | 1.0 | 0.02 | — | — | 0.9 | C |
| Ex. 27* | 100 | 5.2 | 10 | 0.17 | — | 0.83 | 0.02 | — | — | 0.9 | C |
| Ex. 28* | 100 | 5.2 | 30 | — | — | — | — | — | — | 1.3 | C |
| Ex. 29* | 100 | 31.2 | 10 | 1.0 | — | — | 0.08 | — | — | 1.4 | C |
| Ex. 30* | 100 | 5.2 | 75 | — | — | 10 | — | — | — | 1.3 | C |
| Ex. 31* | 100 | 5.2 | 75 | 1.0 | — | 10 | — | — | — | 1.5 | C |
| Ex. 32* | 100 | 5.2 | 75 | — | 2.5 | — | — | — | — | 1.3 | C |

The code * denotes Comparative Example.

Examples 33 to 43

The evaluation cell of Example 33 was fabricated in the same manner as in Example 7 and other evaluation cells for Examples 34 to 43 were each fabricated in the same manner as in Example 7 except that the additives (amino acid, boric acid ($H_3BO_3$) and/or sodium hydroxide (NaOH)) of the type and amount shown in Table 3 were further dissolved in the electrolytic solution in the above (3), and the following evaluations were carried out.

(Charge/Discharge Evaluation)

Chemical conversion was carried out on the simply sealed cells each with 0.1 C charge and 0.2 C discharge by using a charge/discharge apparatus (TOSCAT3100 manufactured by Toyo System Co., Ltd.). Then, a 1 C charge/discharge cycle was carried out. The charge/discharge cycle was repeated under the same conditions, and the number of charge/discharge cycles until a discharging capacity decreased to 70% of the discharging capacity of the first cycle of the prototype battery, was recorded. The number of charge/discharge cycles of each example is shown in Table 3 as a relative value obtained when the number of charge/discharge cycles in Example 33 was 1.0, together with the evaluation results based on the following criteria.

<Evaluation Criteria>

Evaluation A: The number of charge/discharge cycles (relative value to the number of times of Example 33) is 1.4 or more.

Evaluation B: The number of charge/discharge cycles (relative value to the number of times of Example 33) is 1.1 or more and less than 1.4.

Evaluation C: The number of charge/discharge cycles (relative value to the number of times of Example 33) is less than 1.1.

(Evaluation of Area Retention of Negative Electrode (Examples 33 to 36 Only))

Chemical conversion was carried out on the simply sealed cells each with 0.1 C charge and 0.2 C discharge by using a charge/discharge apparatus (TOSCAT3100 manufactured by Toyo System Co., Ltd.). Then, the 1 C charge/discharge cycle was repeated. The area retention of the negative electrode was calculated based on the transmission image of each simply sealed cell by X-ray. Specifically, a three-dimensional measurement X-ray CT apparatus (manufactured by Yamato Scientific Co., Ltd., TDW1300-IW/TDW1000-IW switching type) was used to acquire a transmitted X-ray image of each simply sealed cell at a voltage of 80 kV and a current of 100 μA. The obtained transmission image was divided into 400 squares of 20 squares in length and 20 squares in width, and assuming that the total number of squares in which the negative electrode active material is present in the entire square is denoted as A, the total number of squares in which no negative electrode active material is present in the square is denoted as B, and C is denoted as the total number of cells other than A and B, the area retention (%) of the negative electrode was calculated according to the following equation:

area retention (%)=[($A$+0.5×$C$)/400]×100

Figure 2:
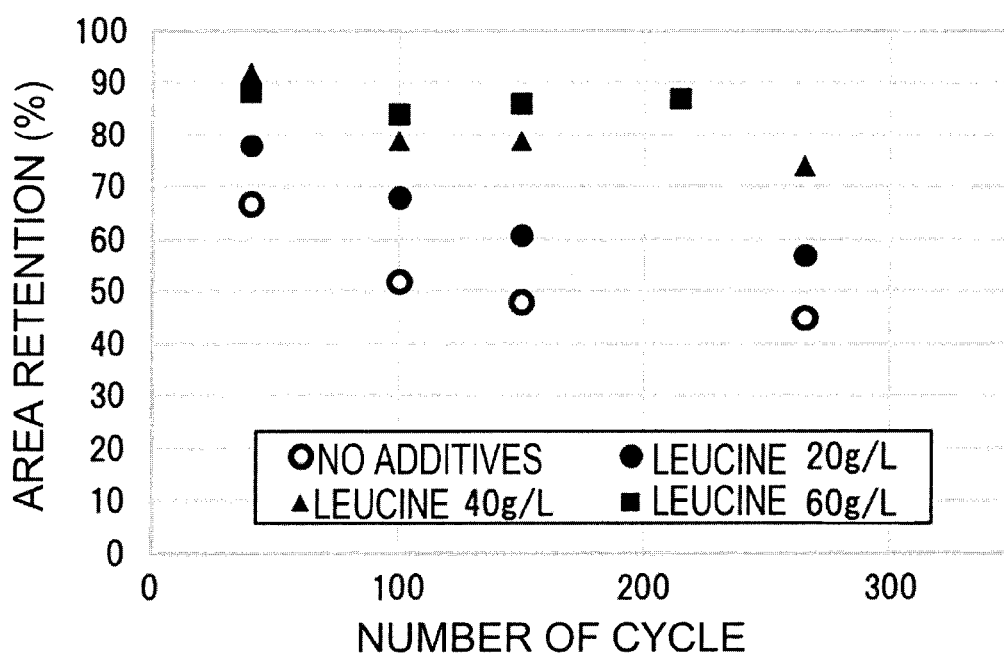
FIG. 2 is a graph illustrating changes in area retentions of the negative electrodes accompanying charge/discharge cycles in the cells using electrolytic solutions with various amounts of leucine added which were measured in Examples 33 to 36.

In FIG. 2, the changes in the area retentions of the negative electrodes according to the number of cycles are shown for the cells using the electrolytic solutions of Example 33 without leucine added, Example 34 with an amount of leucine added of 20.0 g/L, Example 35 with an amount of leucine added of 40.0 g/L, and Example 36 with an amount of leucine added of 60.0 g/L. As can be seen from the results shown in FIG. 2, not only the number of charge/discharge cycles is further increased, but also the effect of inhibiting the morphological change of the negative electrode can be obtained by adding leucine to the electrolytic solution.

TABLE 3

| | Amount of additive added to electrolytic solution | | | The number of charge/discharge | |
|---|---|---|---|---|---|
| | Amino acid | $H_3BO_3$ | NaOH | | |
| | Amino acid type | Amount added (g/L) | Amount added (g/L) | Amount added (g/L) | times (relative value to the number of times of Example 33) | Charge/discharge evaluation |
| Example 33 (same as Ex. 7) | — | — | — | — | 1.0 | C |
| Ex. 34 | Leucine | 20.0 | — | — | 1.4 | A |
| Ex. 35 | Leucine | 40.0 | — | — | 1.3 | B |
| Ex. 36 | Leucine | 60.0 | — | — | 1.2 | B |
| Ex. 37 | Isoleucine | 20.0 | — | — | 1.2 | B |
| Ex. 38 | Isoleucine | 40.0 | — | — | 1.3 | B |
| Ex. 39 | Tryptophan | 20.0 | — | — | 1.0 | C |
| Ex. 40 | Tryptophan | 40.0 | — | — | 0.3 | C |
| Ex. 41 | — | — | 61.8 | 48.0 | 1.1 | B |
| Ex. 42 | Leucine | 20.0 | 61.8 | 48.0 | 1.4 | A |
| Ex. 43 | Leucine | 40.0 | 61.8 | 48.0 | 1.3 | B |

What is claimed is:

1. A negative electrode for use in a zinc secondary battery, comprising:
   (A) ZnO particles; and
   (B) at least two selected from the following group consisting of
   (i) metallic Zn particles having an average particle size D50 of 5 to 80 μm,
   (ii) at least one element selected from the group consisting of In and Bi, contained in the form of at least one of a metal particle, an oxide particle, and a hydroxide particle, and
   (iii) a binder resin having a hydroxyl group,
   wherein when the negative electrode comprises metallic Zn particles, the content of metallic Zn particles is in an amount of 10 to 90 parts by weight, based on the content of the ZnO particles is 100 parts by weight, wherein when the negative electrode comprises In and when the content of elemental In is converted to a content of $In_2O_3$, the content of $In_2O_3$ is 0.3 parts by weight or more to 2.4 parts by weight or less, based on the content of the ZnO particles being 100 parts by weight, wherein when the negative electrode comprises Bi and when the content of elemental Bi is converted to a content of $Bi_2O_3$, the content of $Bi_2O_3$ is 0 parts by weight or more to 0.6 parts by weight or less, based on the content of the ZnO particles being 100 parts by weight, and wherein when the negative electrode comprises the binder resin, the content of the binder resin on a solid basis is 0.01 parts by weight or more to 0.05 parts by weight or less, based on the content of the ZnO particles being 100 parts by weight.

2. The negative electrode according to claim 1, comprising the metallic Zn particles and at least one of the element selected from the group consisting of In and Bi and the binder resin.

3. The negative electrode according to claim 1, comprising all of the metallic Zn particles, the at least one element selected from the group consisting of In and Bi, and the binder resin.

4. The negative electrode according to claim 1, wherein the binder resin having a hydroxy group is a water-soluble polymer.

5. The negative electrode according to claim 4, wherein the water-soluble polymer is polyvinyl alcohol (PVA).

6. The negative electrode according to claim 1, wherein the at least one element selected from the group consisting of In and Bi is contained in the form of the oxide particle.

7. The negative electrode according to claim 1, wherein the negative electrode is a sheet pressed product.

8. A zinc secondary battery, comprising:
a positive electrode,
the negative electrode according to claim 1,
a separator separating the positive electrode from the negative electrode so as to be capable of conducting hydroxide ions therethrough, and
an electrolytic solution.

9. The zinc secondary battery according to claim 8, wherein the separator is a layered double hydroxide (LDH) separator, which comprises an LDH and/or an LDH-like compound.

10. The zinc secondary battery according to claim 8, wherein the LDH separator is composited with a porous substrate.

11. The zinc secondary battery according to claim 8, wherein the positive electrode comprises nickel hydroxide and/or nickel oxyhydroxide whereby the zinc secondary battery forms a nickel-zinc secondary battery.

12. The zinc secondary battery according to claim 8, wherein the positive electrode is an air electrode whereby the zinc secondary battery forms a zinc-air secondary battery.

* * * * *